(12) United States Patent
Volchko

(10) Patent No.: US 7,802,761 B2
(45) Date of Patent: Sep. 28, 2010

(54) VEHICLE CLIP METHOD AND APPARATUS

(75) Inventor: Scott Jeffrey Volchko, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/021,857

(22) Filed: Jan. 29, 2008

(65) Prior Publication Data

US 2009/0166489 A1 Jul. 2, 2009

Related U.S. Application Data

(60) Provisional application No. 61/018,429, filed on Dec. 31, 2007.

(51) Int. Cl.
*F16L 3/16* (2006.01)
(52) U.S. Cl. .................. 248/55; 248/68.1; 248/74.2
(58) Field of Classification Search .............. 248/65, 248/73, 74.1, 74.2, 74.4, 68.1, 49, 58, 55; 24/555, 560, 564
See application file for complete search history.

(56) References Cited

U.S. PATENT DOCUMENTS

| 5,002,243 | A | 3/1991 | Kraus et al. |
| 5,257,768 | A | 11/1993 | Juenemann et al. |
| 5,588,683 | A | 12/1996 | Schliessner |
| 5,954,300 | A | 9/1999 | Sturies et al. |
| 6,152,406 | A | 11/2000 | Denndou |
| 6,241,198 | B1 | 6/2001 | Maruyama |
| 6,902,138 | B2 | 6/2005 | Vantouroux |
| 7,179,032 | B2 | 2/2007 | Guy |
| 7,207,258 | B1 * | 4/2007 | Scanlon ................. 89/198 |
| 7,207,528 | B2 * | 4/2007 | Kato ..................... 248/55 |
| 7,614,589 | B2 * | 11/2009 | Kato ..................... 248/55 |
| 2004/0140406 | A1 * | 7/2004 | Kanie .................... 248/73 |
| 2004/0188569 | A1 * | 9/2004 | Bauer ................... 248/68.1 |
| 2005/0001108 | A1 * | 1/2005 | Stigler .................. 248/68.1 |
| 2005/0098688 | A1 * | 5/2005 | Miarka et al. .......... 248/68.1 |
| 2005/0127248 | A1 | 6/2005 | Suzuki et al. |
| 2006/0186279 | A1 * | 8/2006 | Kato ..................... 248/68.1 |

FOREIGN PATENT DOCUMENTS

| DE | 4141689 | 6/1993 |
| DE | 4207583 | 9/1993 |

* cited by examiner

*Primary Examiner*—Ramon O Ramirez
(74) *Attorney, Agent, or Firm*—Kenealy Vaidya LLP; Mark E. Duell

(57) ABSTRACT

A two piece clip device is provided which can retain various components to a vehicle while reducing and/or eliminating the transfer of vibrations from the components to the vehicle. The clip device includes a base section having receivers capable of receiving and retaining components, such as fuel pipes, brake pipes and wire harnesses. The clip device also includes an attachment structure for attaching the entire clip device to a vehicle. A flexible material is deposited between the base section and the attachment structure so that the base section and attachment structure are not in contact with each other.

19 Claims, 4 Drawing Sheets

VEHICLE CLIP METHOD AND APPARATUS

This application claims the priority benefit under 35 U.S.C. §119 of U.S. Provisional Patent Application No. 61/018,429 filed on Dec. 31, 2007, which is hereby incorporated in its entirety by reference.

BACKGROUND

1. Field

The presently disclosed subject matter relates to a clip for gripping a component such as a pipe, tube, conduit, wire, wire harness, etc., to attach the component(s) to a support, such as a vehicle body, and more particularly, to a two piece clip device for gripping component(s) and attaching to a vehicle body. The clip can be configured to minimize the transfer of vehicle body vibrations to the attached component(s) while also safeguarding against detachment from the vehicle body should the damper material fail. The clip also isolates the pipes from transferring noise into the body.

2. Brief Description of the Related Art

Various clamping structures are provided in vehicles to retain components such as fuel pipes, brake pipes and wire harnesses. In some cases, the pipes and cables held by such clips may resonate and transmit vibrations generated by the vehicle engine, fuel pumps, road vibration, etc. These vibrations can be transmitted to the passenger cabin and/or other vehicle components, and in some cases can be heard and/or felt by passengers of the vehicle and/or become destructive forces that deteriorate vehicle components. To reduce transmission of such vibrations, vibration absorbing clamps are used to attach certain components, such as fuel pipes, brake pipes or wire harnesses to a support such as a vehicle body to prevent the transmission of vibrations between the vehicle and the components. In these conventional vibration absorbing clamps, a single unitary clip may be provided having c-shaped receiving portions for receiving the components. These c-shaped receiving portions may be lined with a soft plastic vibration absorbing material to absorb vibrations that attempt to transmit between the component and the clip. Other conventional vibration absorbing clamps provide hard plastic pipe grippers for gripping pipes and which include vibration damping materials disposed between a base and the pipe grippers to absorb vibrations.

The unitary design of conventional vibration absorbing clamps often results in vibrations being transferred between the vehicle and components mounted on the clamps. This occurs despite the use of vibration absorbing materials. In addition, in many cases, the vibration absorbing material or damper becomes brittle due to age, sunlight, adverse environmental conditions, etc. In this case, when the vibration absorbing material or damper becomes brittle or deteriorates, the clamp becomes less effective and may actually fail because the component that is being held either slips out or vibrates out of the clamp. Thus, it would be desirable to provide an improved structure for a clip device capable of being mounted to a vehicle and capable of retaining components in a manner so that vibrations are prevented from being transmitted from the components to the vehicle or vice versa, and which provides a fail safe type of feature that would allow the clip to function even after the damper or vibration material is deteriorated or destroyed in some manner.

SUMMARY

The disclosed subject matter addresses the drawbacks in the conventional vibration clip devices by providing a two piece clip structure for attachment to a vehicle. The clip structure is also capable of receiving and retaining components, such as fuel pipes, brake pipes, pneumatic or other tubes, wire harnesses, etc. The clip structure according to the disclosed embodiments reduces and/or eliminates the transfer of vibrations between the attached component(s) and the vehicle. According to one aspect of the disclosed embodiments, the clip device includes a base section and an attachment structure whereby the base structure and attachment structure are not in contact with each other.

According to another aspect of the disclosed subject matter, a flexible material is deposited between the base structure and the attachment structure which dampens vibrations from the base section and prevents them from being transferred to the attachment structure which is in contact with a vehicle body.

According to another aspect of the disclosed embodiments, a clip device is provided which includes a base section having at least one receivers for receiving and retaining at least one component and an opening defined by a first mating structure and a second mating structure, an attachment structure having at least one attachment mating structure; and a flexible material disposed between the base section and the attachment structure.

According to another aspect of the disclosed embodiments, the receiver includes at least one elastic wing which retains the received component. However, any mating structure is acceptable for use to retain a component in the receiver.

According to another aspect of the disclosed embodiments, the first and second mating structures and the attachment structure include a plurality of extension bodies and notched formed between the adjacent extension bodies.

According to another aspect of the disclosed embodiments, the first section and the attachment section interlock in the event that the flexible material fails so that the entire clip remains intact.

According to another aspect, a vibration absorbing clip for attaching components to a vehicle can include a base section having at least one receiver configured to receive at least one elongate component, the base section including a base mating structure. An attachment structure can be included and have at least one attachment mating structure and one structure configured for attachment to a portion of a vehicle located at a vehicle facing surface of the attachment structure, the base mating structure being located closer to the vehicle when the clip is attached to the vehicle than the attachment mating structure. A vibration damping material can also be disposed between the base section and the attachment structure such that the base section is spaced from the attachment structure and is not in contact with the attachment structure, wherein the base mating structure and the attachment mating structure are configured such that if the base section is moved in a direction away from the vehicle a predetermined distance, the base mating structure would contact the attachment mating structure to prevent the base section from detaching from the attachment structure.

According to another aspect of the disclosed subject matter, a vibration absorbing clip for attaching components to a vehicle can include a base section including at least one component attachment structure, an attachment structure including vehicle mounting structure configured for attachment to a vehicle located in a first direction from the attachment structure, a vibration damping material located between and spacing the attachment structure from the base section such that the base section is not in contact with the attachment structure, wherein the attachment structure includes means for retaining the base section adjacent the attachment structure if the vibration damping material fails or is damaged.

According to another aspect of the disclosed subject matter, a method for connecting components to a vehicle can include providing a base section having at least one receiver configured to receive at least one component, the base section having an opening including a base mating structure located in the opening, providing an attachment structure having at least one attachment mating structure, placing the attachment structure in the opening of the base section such that the attachment mating structure will contact the base mating structure to prevent movement of the base section in a first downward direction after a predetermined amount of movement of the base section relative to the attachment structure in the first downward direction, and locating a vibration damping material in the opening of the base section such that the base section is spaced from the attachment structure.

Still other aspects, features, and attendant advantages of the disclosed subject matter will become apparent to those skilled in the art from a reading of the following detailed description of embodiments constructed in accordance therewith, taken in conjunction with the accompanying drawings.

BRIEF DESCRIPTION OF THE DRAWINGS

The disclosed subject matter will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
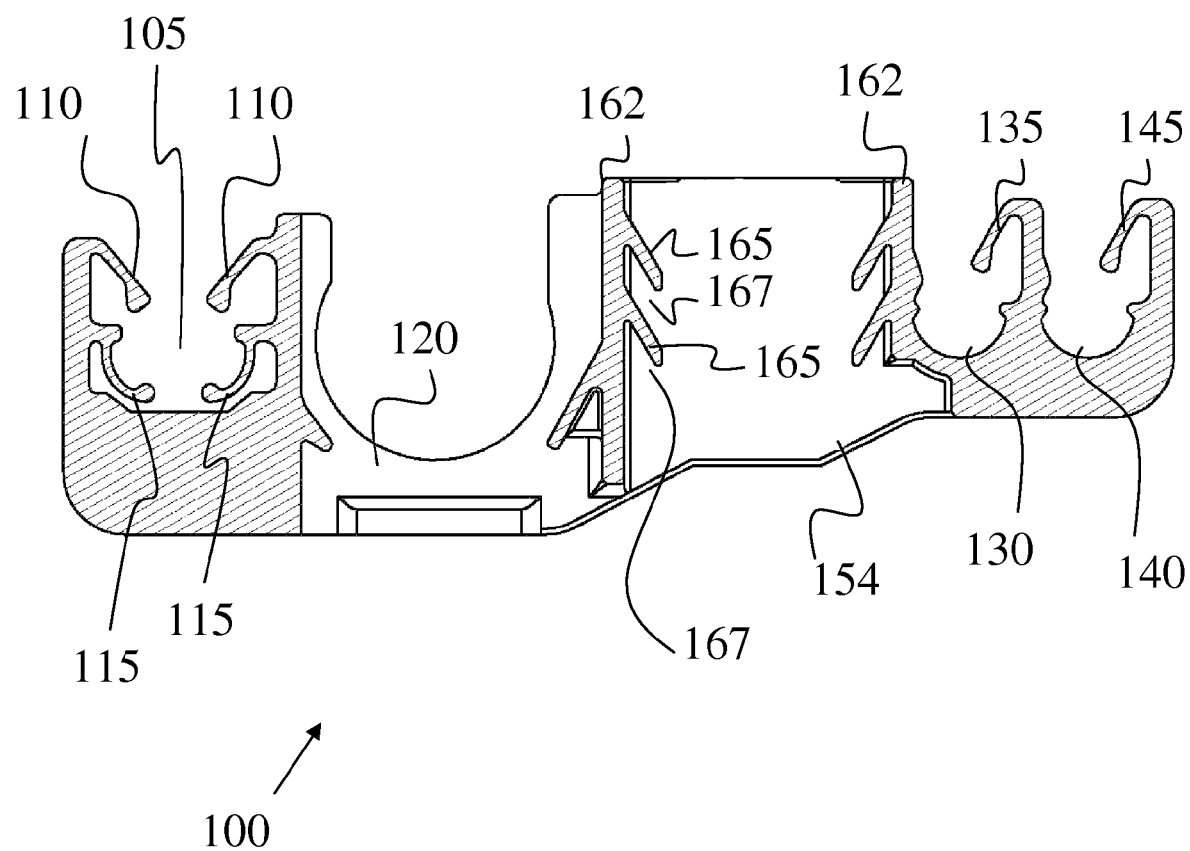
FIG. 1 shows a front cross-sectional view of an exemplary base section of a clip device made in accordance with principles of the disclosed subject matter.

The disclosed subject matter provides a system and method for a clip device for gripping components and attaching to a vehicle body in a manner that reduces and/or eliminates the transfer of vibrations from the vehicle to the attached components while providing a safeguard against clip attachment failure due to deterioration or damage to the vibration damper material therein.

Referring to the drawing figures, like reference numerals designate identical or corresponding elements throughout the several figures.

Figure 3:
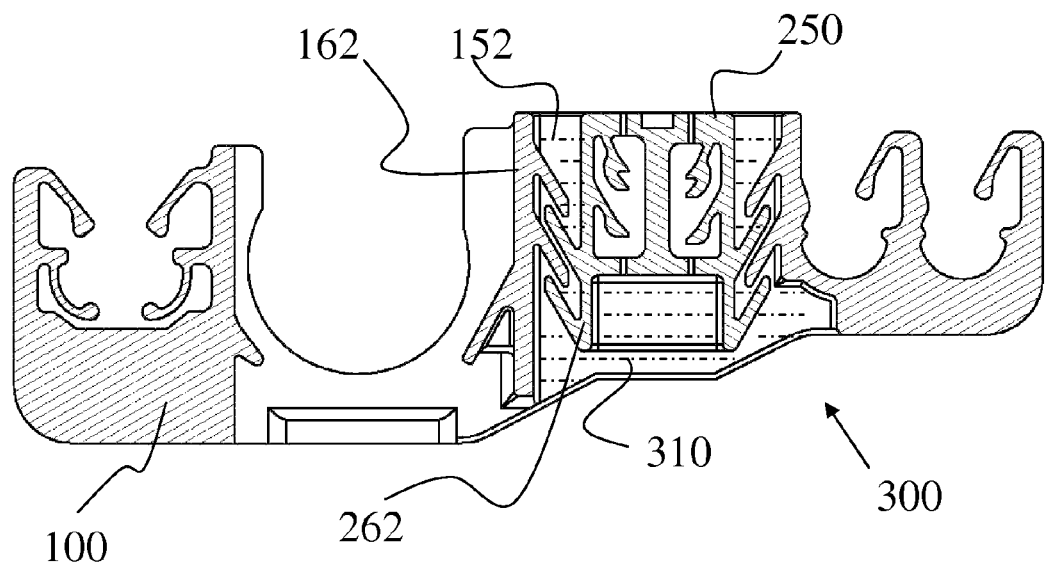
FIG. 3 shows a front cross-section view of the exemplary clip device of FIG. 1 including the base section and the attachment structure.

FIG. 1 illustrates a cross-sectional front view of an exemplary embodiment of a first section 100 of a clip device made in accordance with principles of the disclosed subject matter. The first section 100 can also be referred to as a base section 100 of a clip device 300 that includes a base section 100, an attachment structure 250, and a vibration damping material 310 therebetween as shown in FIG. 3. The base section 100 and attachment structure 250 may be made of a variety of materials, such as a hard plastic having sufficient rigidity to hold a given shape, while the vibration damping material can be made up of a softer material or other type of material that is designed to reduce transmission of vibration between the base section 100 and the attachment structure 250 when they are attached to each other.

The base section 100 includes a plurality of gripping receivers 105, 130 and 140 capable of receiving and retaining components, such as pipes, tubes, conduits, wire harnesses, etc. Gripping receiver 105 has generally vertical sides and a first set of elastic wings 110 and a second set of elastic wings 115. The first set of elastic wings 110 are plate-shaped and extend on an incline from a top edge of the vertical side of the gripping receiver 105 toward the bottom of the gripping receiver 105. The tips of the elastic wings 110 can be configured to make contact with a component resting in the gripping receiver 105 to lock it in and keep it from coming out of the gripping receiver 105. The second set of elastic wings 115 can have a curved shape and extend from the sides of the vertical wall of the gripping receiver 105 toward the bottom of the gripping receiver 105. The tips of the second set of elastic wings 115 can also make contact with the component resting in the gripping receiver 105 to keep it from coming out of the gripping receiver 105 and provide a secure and yet elastic connection between the base section 100 and the component.

As shown in FIG. 1, the gripping receiver 130 can have nearly vertical walls and a curved bottom for receiving a cylindrical object such as a tube, wire or pipe. Of course, the bottom shape can be shaped differently depending on what type of component it is intended to hold. A plate-shaped elastic wing 135 is provided which extends on an incline from the top of one side of the gripping receiver 130 toward the bottom of the gripping receiver 130. The tip of the elastic wing 135 makes contact with a component resting on the bottom of the gripping receiver 130 to prevent it from coming out of the gripping receiver 130.

Gripping receiver 140 is formed adjacent gripping receiver 130 and similarly has nearly vertical walls and can have a curved (or other shaped) bottom for receiving a component such as a pipe, tube, conduit, wire harness, etc. A plate-shaped elastic wing 145 is provided which extends on an incline from the top of one side of the gripping receiver 140 toward the bottom of the gripping receiver 140. The tip of the elastic wing 145 makes contact with a component resting on the bottom of the gripping receiver 140 to prevent it from coming out of the gripping receiver 140.

FIG. 1 also illustrates that the base section 100 includes a receiver 120 for receiving another component or for receiving a portion of the vehicle body that might mate with the clip device 300 at this particular location. In the embodiment shown, the receiver 120 has a generally cylindrical shaped lower section and generally vertical walls formed on its upper section.

The base section 100 can also include mating structures 162 which define an opening 154 for receiving the attachment structure 250 (not shown in FIG. 1). The mating structures 162 can be formed in an opposing manner so as to face one another in the opening 154 as shown in the rectangular opening depicted in the exemplary embodiment, or can be formed around a perimeter of the opening 154, especially if the opening is circular, etc. The mating structures 162 include a plurality of extension bodies 165 which extend on an incline from the mating structures 162 toward the bottom of the opening 154. Notches 167 are formed between and defined by the adjacent extension bodies 165. As will be described in greater detail below, the mating structures 162 are capable of receiving the attachment structure 250.

Figure 2:
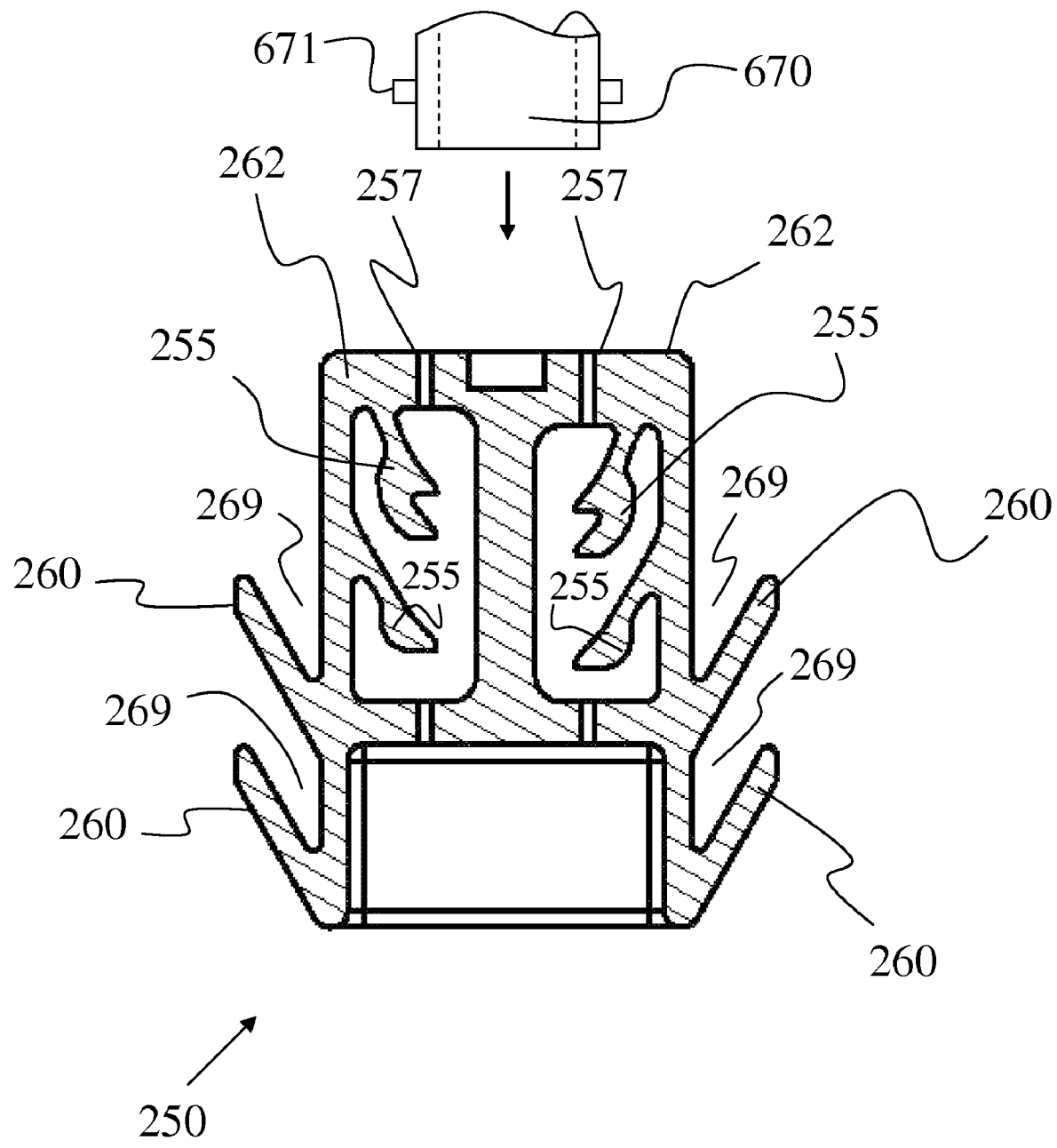
FIG. 2 shows a front cross-sectional view of an exemplary attachment structure of the clip of FIG. 1.

FIG. 2 shows the second section, or attachment structure 250. The attachment structure 250 can be formed as a separate structure from the base section 100. As will be described in greater detail below, the attachment structure 250 is capable of fitting into the base section 100 but does not actually make contact with the base section 100 when the entire clip structure is assembled. Referring to FIG. 2, the attachment structure 250 has substantially vertical walls which are substantially parallel to one another. The mating structures 262 are formed along the vertical side walls of the attachment structure 250. The mating structures 262 can include a plurality of extension bodies 260 which extend upward on an incline from a lower portion of the attachment structure. Notches 269 are formed between adjacent extension bodies 260. As will be described in greater detail below, the mating structures 262 are capable of being received by the mating structures 162 of the base section 100.

FIG. 2 also shows that the attachment structure 250 includes a hollow section in its center for receiving a connecting device 670 associated with the vehicle. Two pairs of engagers (e.g., pawls) 255 extend downward from the top towards the center of the attachment structure 250 to engage threads, circumferential grooves, or other types of ratchet pawl(s) 671 located on the connecting device 670 that extends from the vehicle. In this manner, the attachment structure 250 can be mounted to a vehicle body via a connecting device 670 or other structure that includes mating threads/pawls 671. In particular, the attachment device 670 can be configured as a stud or bolt built into or connected to a vehicle body portion such that it extends outward from the vehicle. Hoses, tubes, pipes, or other components can be placed into the clip device 300 prior to or during the attachment process when the clip device 300 is attached to the vehicle. For example, if the components 630 are already located in the clip device 300, the user can "pop" the clip device 300 onto the vehicle by pushing the clip device 300 such that the connecting device 670 on the vehicle body enters through aperture(s) 257 on the attachment structure 250. The pawls 671 of the connecting device 670 then mate with the pawls 255 of the clip device 300 attachment structure 250 to connect the clip device 300 to the vehicle.

FIG. 3 shows the base section 100 fitted with the attachment structure 250 which results in an operable clip device 300. As shown in FIG. 3, the attachment structure 250 is capable of being fitted into the opening 154 of the base section 100 resulting in a space 152 between base section 100 and attachment structure 250. The attachment structure 250 can thus be nested within the base section 100. More particularly, the mating structures 262 of the attachment structure 250 nests within the mating structures 162 of the base section 100. Thus, the extension bodies 165 of the base section 100 mate with the notches 269 of the attachment structure 250 and the extension bodies 260 of the attachment structure 250 mate with the notches 167 of the base section 100. It should be understood that in this embodiment of the disclosed subject matter, the base section 100 and attachment structure 250 are not in physical contact (the pawls 165 and pawls 260 are interlocked and yet spaced from each other. The spacing is maintained by the vibration absorbing material 310 that is located between the attachment structure 250 and the base section 100. Thus, the mating structures 162 of the base 100 and the mating structures 262 of the attachment structure 250 while mated are not in contact with each other. Instead, an opening space 152 is formed between mating structures 162 of the base 100 and mating structures 262 of the attachment structure, and the opening 152 is filled with a flexible vibration absorbing damper material 310, such as a rubber, foam, resin, gel, ethylene-propylene terpolymer—EDPM, silicone, etc. The material 310 should be softer than the base section 100 or attachment structure 250 in order to provide a vibration damping function that prevents transmission of vibration between the base section 100 and attachment structure 250, and consequently prevents transmission of vibration between the vehicle and connection structure (e.g. tubing, piping, wire harness, etc.) that is being connected to the vehicle by the clip 300. Some types of flexible material 310 suitable for use with the disclosed subject matter may be injected into the opening 152 and allowed to harden. Specifically, if the material 310 is a soft plastic material suitable for vibration absorption, the material can be melted, injected and allowed to harden inside the mold. The flexible material 310 fills the gaps between the base material 100 and the attachment structure 250, including the area between the mating structures 162 and 262, and serves to separate the base section 100 from the attachment structure 250. Thus, the base section 100 material is isolated from the attachment structure 250. The flexible material 310 is capable of dampening vibrations from the base section 100 to the attachment structure 250 received from components mounted on the base section 100. Thus, vibrations from the components are not transferred to or from other vehicle components.

In operation, various components, such as tubes, wires, pipes, etc., can be fitted in the clip device 300 via the gripping receivers 105, 130 and 140 and/or the receiver 120. The specific configuration and size of the receiver(s) can very greatly. The clip device 300 can be mounted to a body, such as a vehicle body, via the attachment structure 250. In particular, the flexible material 310 serves to isolate the base section 100 and the gripping receivers 105, 130 and 140 and the receiver 120 from the attachment structure 250. Thus, vibrations received/transmitted by the base structure 100 from the attached components 630 are not transferred to the vehicle.

Furthermore, in the event that the flexible material 310 fails, the interlocking structure of the mating structures 162 and 262 will prevent separation of the base section 100 from the attachment structure 250. For example, the pawls 165 of the base section 100 and pawls 260 of the attachment structure 250 can be configured such that if the base section is pulled by gravity or otherwise moved downwards as viewed in FIG. 3, the pawls 260 of the attachment structure will lock onto the pawls 165 of the base section to prevent the base section 100 from totally separating from the vehicle body 610. In this mode, there may be more vibration transfer due to the direct contact between the attachment structure 250 and the base section 100, but the clip device 300 will still remain operative. While angled pawls are shown in the attached figures, it should be understood that many different types of mating structure are contemplated for use as the pawls 165 and pawls 260 of the clip device 300. For example, ledge type mating structures could be used, etc.

Figure 4:
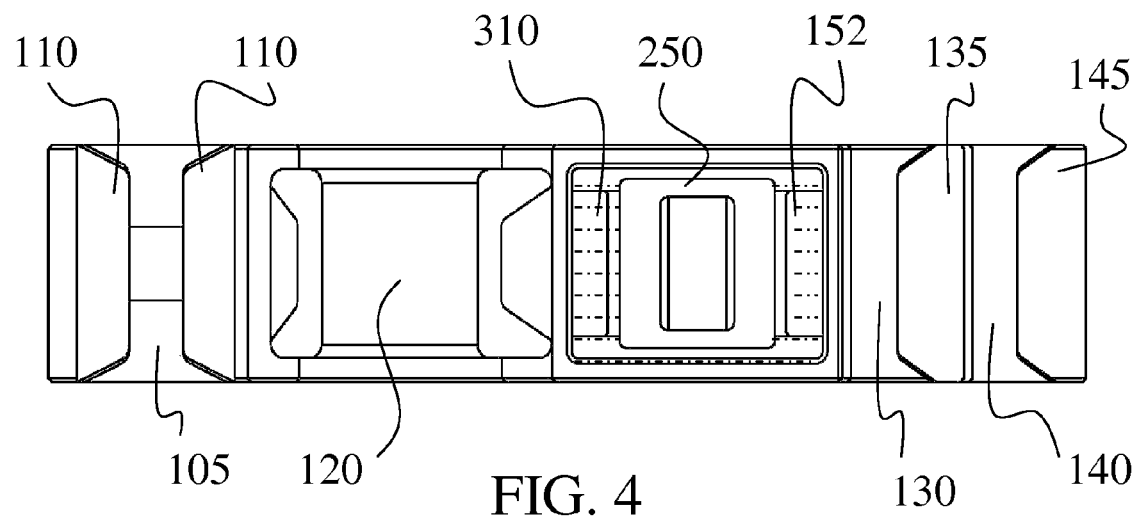
FIG. 4 is a top view of the exemplary clip device of FIG. 1.

FIG. 4 shows a top view of the clip device 300. The gripping receiver 105 is shown as including a first set of elastic wings 110. As described above, the gripping receiver 105 is capable of receiving and retaining a component 630, such as a pipe, etc. The gripping receiver 130 is shown as including an elastic wing 135, and the adjacent gripping receiver 140 is shown with elastic wing 145. Each of the gripping receivers 130 and 140 is capable of receiving and retaining components 630. The opening 152 can be filled with a flexible material 310.

Figure 5:
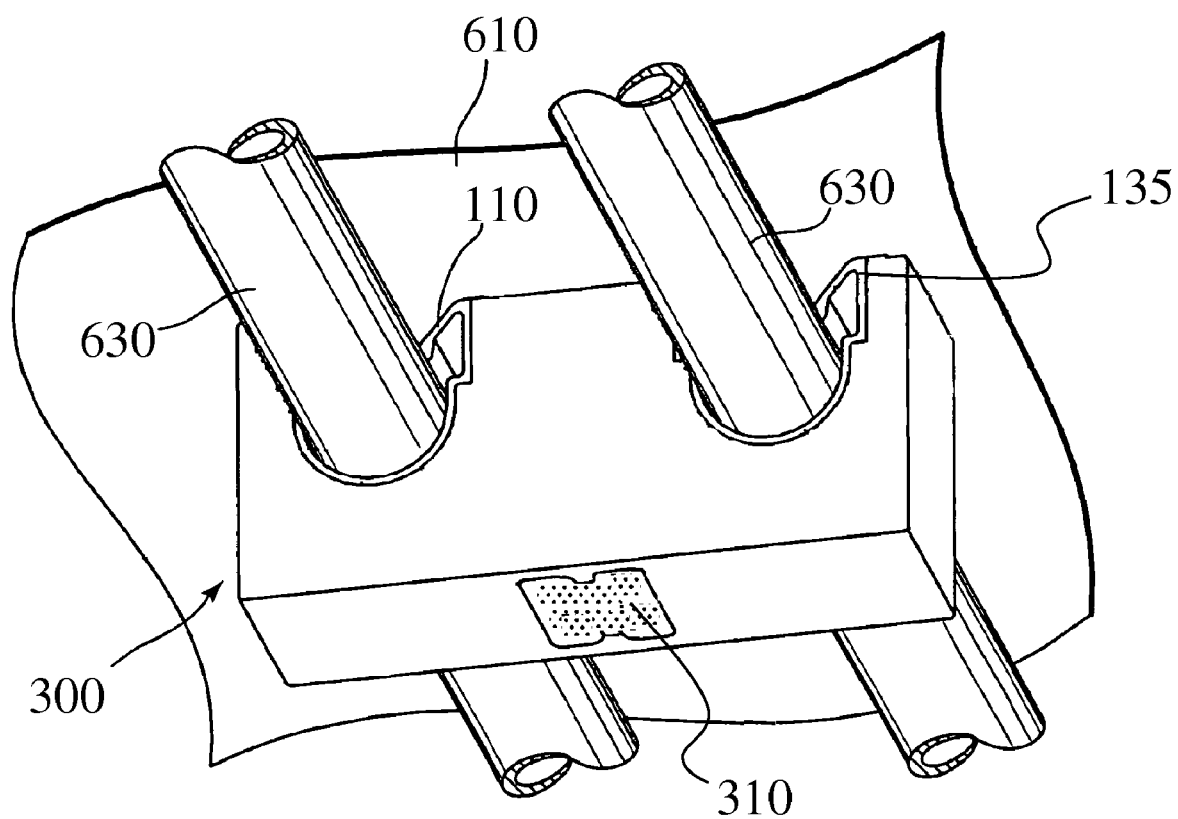
FIG. 5 is a perspective view of another embodiment of a clip device made in accordance with principles of the disclosed subject matter and attached to a vehicle.

FIG. 5 shows another embodiment of a clip device 300 that is fixed to a vehicle body panel 610. The attachment structure 250 can be supported on the vehicle body panel 610 by a connecting device 670 extending from the panel 610 and into the attachment structure 250. FIG. 5 also shows a component 630 formed as a tube retained in the gripping receiver 105 by a separately formed wing structure 110. Likewise, a second component 630 can be retained by the clip device 300 using a receiver 130 including a separately formed wing structure 135. As described above, the clip 300 includes two separate sections, the base section 100 and the attachment section 250 (which cannot be seen in this figure). The base section 100 and attachment section 250 are nested but are not in contact with each other due to the vibration damping material 310 disposed between the base section 100 and the attachment section 250. Vibration to or from the components 630 is not transferred to or from the attachment structure 250, and thus is not transferred to or from the vehicle panel 610.

It should be noted that several of the disclosed structures that make up the clip device 300 can be varied in terms of shape, size, material, connections, etc., without departing from the spirit and scope of the presently disclosed subject matter. For example, the attachment structure 250 can be any structure capable of being mounted to a vehicle body, including but not limited to an anchor-shaped clip, for example, that is inserted into and engaged with a mounting structure on the vehicle. In addition, the clip could also be bolted directly or include some other attachment method, such as push pin, etc. Furthermore, the number, shape and size of the gripper receivers 105, 130 and 140 and the receiver 120 may depend on the number and type of components to be attached, whether it is a fuel pipe or brake line, for example. The clip device may be made of a variety of materials, such various hard plastics. In addition, the shape of the components can vary, including circular in cross-section, rectangular in cross-section, non-symmetrical in cross-section, tubular, etc.

In addition, is it contemplated that the mating structures be inversed. For example, the elongate bodies 165 of the base section 100 can be located about an outer peripheral surface, while the attachment structure 250 could be configured as a larger structure that encompasses a portion of the base section 100 and includes elongate bodies 260 on an inner peripheral surface thereof to engage or lock the attachment structure 250 with the base section 100 should the vibration damper decompose or fail in some way.

The clip 300 could also be configured to be attached to a top surface of a vehicle or other body portion such that the components are held above the vehicle or other body portion. In this case, the orientation/angle of the extension bodies 165 and 260 should be reversed and the attachment mating structure's potential contact surface(s) should located below (closer to the vehicle or other body portion) as compared to the base section mating structure's potential contact surface(s).

While the invention has been described in detail with reference to exemplary embodiments thereof, it will be apparent to one skilled in the art that various changes can be made, and equivalents employed, without departing from the scope of the invention. The foregoing description of embodiments of the invention has been presented for purposes of illustration and description. It is not intended to be exhaustive or to limit the invention to the precise form disclosed, and modifications and variations are possible in light of the above teachings or may be acquired from practice of the disclosed subject matter. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A vibration absorbing clip for attaching components to a vehicle, comprising:
   a base section having at least one receiver configured to receive at least one elongate component, the base section including an opening and a base mating structure located in the opening;
   an attachment structure having at least one attachment mating structure and one structure configured for attachment to a portion of a vehicle located at a vehicle facing surface of the attachment structure, the base mating structure being located closer to the vehicle when the clip is attached to the vehicle than the attachment mating structure; and
   a vibration damping material disposed in the opening of the base section and between the base section and the attachment structure such that the base section is spaced from the attachment structure and is not in contact with the attachment structure, wherein the base mating structure and the attachment mating structure are configured such that if the base section is moved in a direction away from the vehicle a predetermined distance, the base mating structure would contact the attachment mating structure to prevent the base section from detaching from the attachment structure.

2. The vibration absorbing clip according to claim 1, wherein the at least one receiver includes an elastic wing.

3. The vibration absorbing clip according to claim 2, wherein the elastic wing extends on an incline from a top edge of the receiver toward a bottom section of the receiver.

4. The vibration absorbing clip according to claim 1, wherein the at least one receiver includes substantially vertical walls and a curved bottom section.

5. The vibration absorbing clip according to claim 1, wherein the base mating structure includes at least one extension body extending and angled away from the vehicle when the clip is attached to the vehicle, and the attachment mating structure includes at least one extension body angled and extending towards the vehicle when the clip is attached to the vehicle.

6. The vibration absorbing clip according to claim 5, wherein the attachment structure includes an opening, and the base mating structure is located in the opening.

7. The vibration absorbing clip according to claim 5, wherein the attachment structure includes an outer peripheral surface, and the base mating structure is located in the outer peripheral surface.

8. The vibration absorbing clip according to claim 1, wherein the attachment structure includes an opening, and the base mating structure is located in the opening.

9. The vibration absorbing clip according to claim 1, wherein the at least one attachment mating structure includes a plurality of extension bodies and notches formed between adjacent extension bodies.

10. The vibration absorbing clip according to claim 1, wherein the attachment structure includes a hollow section configured to receive a connecting device having at least one of a pawl and a thread.

11. The vibration absorbing clip according to claim 10, wherein a plurality of engagers are formed in the hollow section, the plurality of engagers are configured to engage at least one of the pawl and the thread of the connecting device.

12. The vibration absorbing clip according to claim 1, wherein the at least one component includes one of a fuel line, a brake line, and a wire harness.

13. The vibration absorbing clip according to claim 1, wherein the flexible material is a soft resin material.

14. The vibration absorbing clip according to claim 1, wherein base section includes an opening, and the base mating structure and attachment mating structure are located in the opening.

15. A vibration absorbing clip for attaching components to a vehicle, comprising:
- a base section including at least one component attachment structure and an opening,
- an attachment structure including a vehicle mounting structure configured for attachment to a vehicle located in a first direction from the attachment structure;
- a vibration damping material located in the opening of the base section and between and spacing the attachment structure from the base section such that the base section is not in contact with the attachment structure, wherein the attachment structure includes means for retaining the base section adjacent the attachment structure when the vibration damping material fails.

16. A method for connecting components to a vehicle, comprising:
- providing a base section having at least one receiver configured to receive at least one component, the base section having an opening including a base mating structure located in the opening;
- providing an attachment structure having at least one attachment mating structure;
- placing the attachment structure in the opening of the base section such that the attachment mating structure will contact the base mating structure to prevent movement of the base section in a first downward direction after a predetermined amount of movement of the base section relative to the attachment structure in the first downward direction;
- locating a vibration damping material in the opening of the base section such that the base section is spaced from the attachment structure.

17. The method for connecting components to a vehicle of claim 16, wherein the vibration damping material is more flexible than the material of the attachment structure and the material of the base section.

18. The method for connecting components to a vehicle of claim 16, further comprising:
- attaching the attachment structure to a vehicle body such that the first downward direction is a direction away from the vehicle body.

19. The method for connecting components to a vehicle of claim 16, wherein locating includes injecting a soft plastic into the opening of the base section while the base section is spaced from the attachment structure.

* * * * *